United States Patent
Mohler

(10) Patent No.: US 9,241,069 B2
(45) Date of Patent: Jan. 19, 2016

(54) EMERGENCY GREETING OVERRIDE BY SYSTEM ADMINISTRATOR OR ROUTING TO CONTACT CENTER

(71) Applicant: Avaya Inc., Basking Ridge, NJ (US)

(72) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 41 days.

(21) Appl. No.: 14/146,527

(22) Filed: Jan. 2, 2014

(65) Prior Publication Data
US 2015/0189084 A1 Jul. 2, 2015

(51) Int. Cl.
*H04M 11/00* (2006.01)
*H04M 3/51* (2006.01)

(52) U.S. Cl.
CPC .................................. *H04M 3/5116* (2013.01)

(58) Field of Classification Search
CPC ....... H04M 3/493; H04M 3/533; H04M 3/50; H04M 3/53383; H04M 3/53391; H04M 2242/04; H04M 3/5116
USPC ........................................................... 379/45
See application file for complete search history.

(56) References Cited

U.S. PATENT DOCUMENTS

| | | | |
|---|---|---|---|
| 6,879,668 B2* | 4/2005 | Neuwald et al. | 379/93.24 |
| 7,903,801 B1* | 3/2011 | Ruckart | 379/201.06 |
| 7,983,910 B2 | 7/2011 | Subramanian et al. | |
| 7,996,210 B2 | 8/2011 | Godbole et al. | |
| 8,010,539 B2 | 8/2011 | Blair-Goldensohn et al. | |
| 8,111,813 B2* | 2/2012 | Weber et al. | 379/88.14 |
| 8,352,405 B2 | 1/2013 | Fang et al. | |
| 8,463,594 B2 | 6/2013 | Au | |
| 8,463,606 B2 | 6/2013 | Scott et al. | |
| 8,700,480 B1 | 4/2014 | Fox et al. | |
| 8,838,633 B2 | 9/2014 | Dhillon et al. | |
| 2007/0064882 A1* | 3/2007 | Ger et al. | 379/33 |
| 2010/0050117 A1 | 2/2010 | Sherrard et al. | |
| 2011/0002451 A1 | 1/2011 | Moran et al. | |
| 2011/0013756 A1 | 1/2011 | Davies et al. | |
| 2011/0078167 A1 | 3/2011 | Sundaresan et al. | |
| 2011/0207437 A1 | 8/2011 | Richardson et al. | |
| 2012/0245925 A1 | 9/2012 | Guha et al. | |
| 2012/0246104 A1 | 9/2012 | Di Sciullo et al. | |
| 2012/0296845 A1 | 11/2012 | Andrews et al. | |
| 2013/0046756 A1 | 2/2013 | Hao et al. | |
| 2013/0103623 A1 | 4/2013 | Burstein et al. | |
| 2013/0218640 A1 | 8/2013 | Kidder et al. | |
| 2013/0231975 A1 | 9/2013 | High et al. | |
| 2013/0311485 A1 | 11/2013 | Khan | |
| 2014/0019118 A1 | 1/2014 | Tromp | |
| 2014/0058721 A1 | 2/2014 | Becerra | |
| 2014/0095148 A1 | 4/2014 | Berjikly et al. | |
| 2014/0282934 A1* | 9/2014 | Miasnik et al. | 726/5 |
| 2014/0304343 A1 | 10/2014 | Skiba et al. | |
| 2015/0106155 A1 | 4/2015 | Castellanos et al. | |

OTHER PUBLICATIONS

U.S. Appl. No. 14/020,674, filed Sep. 6, 2013, Skiba et al.
U.S. Appl. No. 14/021,889, filed Sep. 9, 2013, Skiba.
U.S. Appl. No. 14/023,967, filed Sep. 11, 2013, Becker et al.
U.S. Appl. No. 14/024,334, filed Sep. 11, 2013, Skiba et al.
"Verint Extends Customer Interaction Analytics Portfolio with Addition of Sentiment and Text Analytics Software," Verint System Inc., Sep. 29, 2010, 3 pp. [http://www.verint.com/news-events/press-releases/2010-pr-archives/09_29_2010.html].
Devillers et al. "Annotation and Detection of Emotion in a Task-oriented Human-Human Dialog Corpus," ISLE workshop, Dec. 2002, 10 pages.

* cited by examiner

*Primary Examiner* — Stella L Woo
(74) *Attorney, Agent, or Firm* — Sheridan Ross P.C.

(57) ABSTRACT

The system of the present disclosure can determine that one or more of a selected person and communication device of the selected person has been or may be impacted by an emergency event and, in response, change one or more of the following: a greeting message provided to a contactor, a status of the selected person, and a communication event treatment of an inbound communication event from the contactor to the selected person and/or communication device to notify the contactor of an impact or potential impact of the emergency event on the selected person and/or communication device and/or service the inbound communication event notwithstanding the impact of the emergency event on the selected person and/or communication device.

23 Claims, 6 Drawing Sheets

US 9,241,069 B2

EMERGENCY GREETING OVERRIDE BY SYSTEM ADMINISTRATOR OR ROUTING TO CONTACT CENTER

FIELD

The disclosure relates generally to communications and particularly to a messaging service for emergency events.

BACKGROUND

In any communications system, a first party has the ability to contact and communicate with a second party. For example, a calling party has the ability to communicate by placing a voice call to a called party. Similarly, an emailing party has the ability to send an email message to someone else, a text-messaging party has the ability to send a text message to someone else, and so forth.

Each communicating party has the ability to provide alternative treatment for an incoming call or message, in the event that the party is not there, or is otherwise occupied, to respond to the communication attempt. For example, a called party who is not available to receive an incoming voice call may record ahead of time an outgoing voice message to be played for the far-end party who has called. And an emailed party who is not available to respond to a received email may provide ahead of time an out-of-office message to be sent to the far-end party in response to the received email. While greeting unification and user of a scheduler or other entries to fill in a generic greeting with dates of absence and other information are known, emergency or black swan events can not only disrupt businesses but also business communications to employees and other business representatives. When a region is impacted severely by a weather event or other significant emergency event, an enterprise or other organization can be confronted with an inability for customers, partners and suppliers to reach their normal contacts (i.e., individual users). While business continuity and recovery plans have provisions for call center and other operations switch-over during such events, this can leave the problem of individual voice mail greetings, email auto-responses, and the like unaddressed. Not all users possess the facts about the outage until after it has occurred and, by then, may not have power or the communications capabilities to be able to appropriately change such greetings and automatic responses.

SUMMARY

These and other needs are addressed by the various aspects, embodiments, and/or configurations of the present disclosure. The present disclosure is directed to an emergency response system.

The system can perform the following operations:

(a) determine that one or more of a selected person and a selected communication device of the selected person has been or may be impacted by an emergency event; and (b) in response to the determining operation, change one or more of the following: a greeting message provided to a contactor, a status of the selected person, and a communication event treatment of an inbound communication event from the contactor to the selected person and/or communication device to notify the contactor of an impact or potential impact of the emergency event on the selected person and/or communication device and/or service the inbound communication event notwithstanding the impact of the emergency event on the selected person and/or communication device.

The system can determine that a communication device associated with a selected person has been impacted by an emergency event.

The determination can be based on input from the systems monitor.

The greeting message can include generic and personalized message portions.

The personalized message portion can be associated uniquely with the person being contacted.

The generic message portion can be provided to all contactors to persons affected or potentially impacted by the emergency event.

The personalized message portion corresponding to the selected person can be provided only to contactors of the selected person.

The content and format of the greeting message can depend upon the contacting communication device and/or contactor identity.

Different greeting messages can be sent to different contactors having different assigned values.

After the impact of the emergency event is determined to be less than a selected impact level, the system can return the greeting message to a pre-emergency event form and content.

The greeting message can be provided to the contactor by one or more of a social network and blog posting.

The status can be a social media status, and the contactor can be provided with a social media status of the selected person.

The communication event treatment can be one or more of routing the inbound communication event to an interactive voice response unit and routing the inbound communication event to a human agent.

The present disclosure can provide a number of advantages depending on the particular aspect, embodiment, and/or configuration. The emergency response system enables group administrators, such as emergency staff and/or system administrators for an enterprise or enterprise location, to over-ride individual greetings, status, and auto responses in mass or in bulk for user group, such as defined by location, region, area, facility, and the like. A single change to the voice mail greeting or email automatic response, for instance, can be propagated to many other messaging systems used by each member of the user group. While it is known for an administrator to change a main greeting of an interactive voice response unit, the emergency response system can change messages for individual group users and multiple messaging servers and communication systems and can make the change once for group users as defined by a location, area, region, etc. In other words, the greetings and email automatic responses do not need to be changed in advance of the emergency event or on a one-by-one basis. If an unexpected emergency event were to occur, the system would still enable these changes to be made. The system can forward inbound contacts from non-group users (e.g., anyone outside the group of users affected or potentially impacted by the emergency event such as a customer) to alternative and available resources during the emergency event. The system can provide substantial cost and time savings by providing and maintaining business continuity during the emergency event. An outage caused by a location or region of an enterprise, governmental agency, and/or other organization can be costly due to the organization being non-responsive to vendors, partners, and customers. The system can provide higher levels of public safety and lower levels of injuries or deaths to group users by more effectively contacting the group users impacted or likely to be impacted by the emergency event. Typical mass television and radio broadcasts to all listeners within a defined area have mixed results as they reach only those listening to the broadcast channel. Using multiple forms of communication to contact a group user provides higher levels of assurance that the group user will be contacted successfully.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A "blog" (a blend of the term web log) is a type of website or part of a website supposed to be updated with new content from time to time. Blogs are usually maintained with regular entries of commentary, descriptions of events, or other material such as graphics or video. Entries are commonly displayed in reverse-chronological order. A "blogging service" is a blog-publishing service that allows private or multi-user blogs with time-stamped entries.

The term "communication event" and its inflected forms includes: (i) a voice communication event, including but not limited to a voice telephone call or session, the event being in a voice media format, or (ii) a visual communication event, the event being in a video media format or an image-based media format, or (iii) a textual communication event, including but not limited to instant messaging, internet relay chat, e-mail, short-message-service, Usenet-like postings, etc., the event being in a text media format, or (iv) any combination of (i), (ii), and (iii).

The term "computer-readable medium" refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "database" is an organized collection of data held in a computer. The data is typically organized to model relevant aspects of reality (for example, the availability of specific types of inventory), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multivalue, semantic, and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented, and unstructured databases. "Database management systems" (DBMSs) are specially designed applications that interact with the user, other applications, and the database itself to capture and analyze data.

The terms "determine", "calculate" and "compute," and variations thereof, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof. An "enterprise" refers to a business and/or governmental organization, such as a corporation, partnership, joint venture, agency, military branch, and the like.

A "geographic information system" (GIS) is a system to capture, store, manipulate, analyze, manage, and present all types of geographical data. A GIS can be thought of as a system—it digitally makes and "manipulates" spatial areas that may be jurisdictional, purpose, or application-oriented. In a general sense, GIS describes any information system that integrates, stores, edits, analyzes, shares, and displays geographic information for informing decision making.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERFS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

"Reverse 911™" is a public safety communications system that is commonly used by public safety organizations in Canada and the United States to communicate with groups of people in a defined geographic area. The system uses a database of telephone numbers and associated addresses, which, when tied into geographic information systems, can be used to deliver recorded emergency notifications to a selected set of telephone service subscribers.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running Servers commonly operate within a client-server architecture, in which servers are computer programs running to serve the requests of other programs, namely the clients. The clients typically connect to the server through the network but may run on the same computer. In the context of Internet Protocol (IP) networking, a server is often a program that operates as a socket listener. An alternative model, the peer-to-peer networking module, enables all computers to act as either a server or client, as needed. Servers often provide essential services across a network, either to private users inside a large organization or to public users via the Internet.

The term "social network" refers to a web-based social network maintained by a social network service. A social network is an online community of people, who share interests and/or activities or who are interested in exploring the interests and activities of others.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Overview

Figure 1:
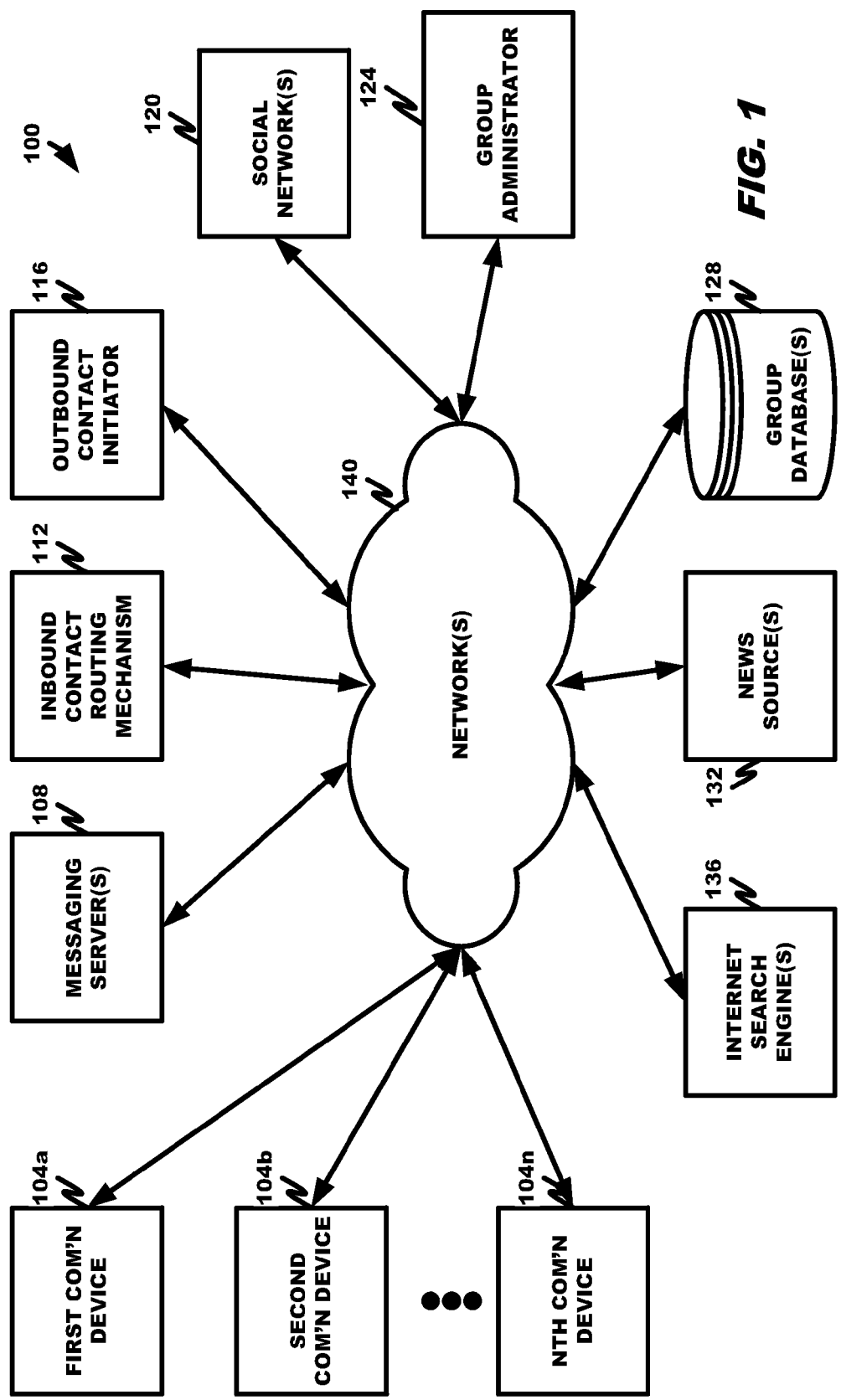
FIG. 1 is a block diagram of a communications system according to an embodiment of the disclosure.

An emergency response system according to this disclosure can perform any of multiple tasks in response to occurrence of an emergency event. For example, the system can selectively broadcast messages simultaneously to selected communication devices or contact only a selected communication device located physically in or associated with a user currently located physically in or likely to be located physically in an area impacted or potentially impacted by the emergency event. The system can over-ride individual greetings/status and automated responses of one or more communication device users located physically in or having a communication device located physically in or controlled by a switch or server located physically in an area impacted or potentially impacted by the emergency event. A single change to a selected message, such as a voice greeting or email automated response can be propagated to other messaging server(s) used by each group user. The system can automatically generate messages using predefined information stored in text or audio form. The system can automatically set a coverage path for selected electronic addresses, such as for all email automated response systems, voice mail greetings, social media status, and the like to a selected communication endpoint, such as a sort of contact center where a message indicating the emergency can be played, and/or to a selected communication device of a non-group user, such as another business associate, not impacted or affected by the emergency event Prior to describing examples of infrastructures to manage communications during an emergency event, it is important to understand the concept of a group of users (or user group).

Generally, a group of users refers to a set of users having one or more common characteristics. Exemplary characteristics include geographical location, business employment or other affiliation (e.g., consultant and contractor), communication device subscription or service recipient (e.g., enterprise subscribers and recipients or customers of communication services from a common communication service provider (e.g., such as an internet service provider, wireless service provider, network connectivity service provider, telephone company, and media provider (e.g., cable or satellite television service provider)), and governmental entity affiliation (e.g., citizenship). By way of illustration, a group of users can be all communication users residing at a specified location or in one or more of a set of locations impacted by an emergency event. By way of further illustration, a group of users can be all enterprise communication subscribers having a communication device serviced by a specified facility and/or stationed at the specified facility impacted by the emergency event and/or residing in an area impacted by the emergency event.

An "emergency event" can be any of a number of disruptive events. Examples of events adversely impacting a business operation include a natural disaster event, such as an earthquake, tsunami, volcanic eruption, fire, flood, avalanche, and/or landslide, a weather event, such as a storm, typhoon, hurricane, cyclone, tornado, wind, and/or blizzard, a political event, such as coup d'etate, sabotage, terrorism, act of war, military action, police action, embargo, and/or blockade, and a business event, such as a maritime vessel sinking, train derailment, freight vehicle wreck, device or system malfunction (e.g., such as caused by a virus, malware, or other computer or computer network attack), criminal activity, airplane crash, labor disruption, lawsuit, financial insolvency, and/or bankruptcy.

The Distributed Processing Network 100

FIG. 1 depicts a distributed processing network 100 for managing communications during an emergency event. The distributed processing network 100 includes first, second, . . . nth (user) communication devices 104a-n, messaging server(s) 108, inbound contact routing mechanism 112, outbound contact initiator 116, social network(s) 120, group administrator 124, group database(s) 128, news source(s) 132, and Internet search engine(s) 136, all connected by one or more communication network(s) 140.

Each of the communication devices 104a-n is associated with a different member of a user group (or group user) and is capable of handling one or more communication events. The communication devices are each capable of handling communication events in various media formats such as voice, video, image-based, and text. Examples of communication devices include cell phones, telephones, computers (e.g., personal computers, tablet computers, and laptops), personal digital assistants, set-top boxes, televisions, radios, and the like.

Messaging server(s) 108 provide predetermined, prerecorded, or computer generated messages to one or more contactors or contactees. The messages can be in any format or combination of formats, whether text, audio, or visual or a combination thereof. An example of a messaging server is a unified messaging server that consolidates and manages multiple types, forms, or modalities of messages, such as voice mail, email, short-message-service text message, instant message, video call, and the like.

In general, the messaging server 108 is capable of storing greeting messages, which are provided by the user in a preselected media format (e.g., voice, text, video, etc.). In accordance with an illustrative embodiment, the messaging server 108 is also capable of generating additional greeting messages customized for the emergency event in response to arrival or initiating notifications of inbound and outbound communication events, respectively.

The inbound contact routing mechanism 112 receives incoming contacts and directs the contact to an appropriate communications device or devices selected by the group administrator. A server or communications switch is an example of an inbound contact routing mechanism 112.

The outbound contact initiator 116 receives a computer generated message and directs the message to one or more internal or external communication devices selected by the group administrator. An example of an outbound contact initiator is a predictive or outbound dialer, a television network or broadcaster, a radio broadcaster, and the like. A predictive dialer is a computerized system that automatically initiates contacts to selected electronic address (e.g., dials batches of telephone numbers) for connection to a human or automated agent.

The social network(s) are associated with one or more of the group users and/or with the group administrator 124.

The group administrator 124 refers to an entity having a specified relationship with a group user, a degree of control over a group user's communication device, and/or a degree of control over a response to the emergency event. Examples of group administrators include not only an enterprise but also, federal, state or local law enforcement authorities, federal agencies, such as the Federal Emergency Management Agency, military organizations such as the National Guard, a (tele)communication service provider, an emergency service provider, and the like.

The group database(s) 128, which may or may not be administered by the group administrator 124, refer to one or more database(s) containing information related to one or more of the group users. This information includes group user personal information (e.g., age, sex, residence, employer, occupation, pre-existing medical conditions, medical history, etc.), corresponding group member communication device electronic addresses, group member communication preferences, group member social network affiliations and memberships, and current group member communication status (e.g., available, unavailable, on line, busy, active, inactive, etc.). An example of a group database 128 is a presence service. A presence service is a network service which accepts, stores and distributes presence information. Presence information is a status indicator that conveys an ability and willingness of a potential communication partner to communicate. A user's client provides presence information (presence state) via a network connection to a presence service, which is stored in what constitutes his or her personal availability record (called a presentity) and can be made available for distribution to other users (called watchers) to convey his availability for communication. An enterprise database is another example of a group database. A reverse 911™ service is yet another example of a group database 128. A geographic information system is yet a further example of a group database 128.

The news source(s) 132 can be any network accessible news source or aggregator, such as a television or radio news channel, a news aggregator, a weather data source, a governmental entity, a law enforcement authority, and a military authority.

The Internet search engine(s) 136 can be used to collect selected types of information from a database management system associated with a group database 128 and/or a news source.

The network(s) 140 can be a circuit and/or packet switched network, such as a wide area network ("WAN") that covers a broad area (e.g., any communications network that links across metropolitan, regional, or national boundaries) using private and/or public network transports. An exemplary WAN is the Internet.

The Emergency Response System 200

Figure 2:
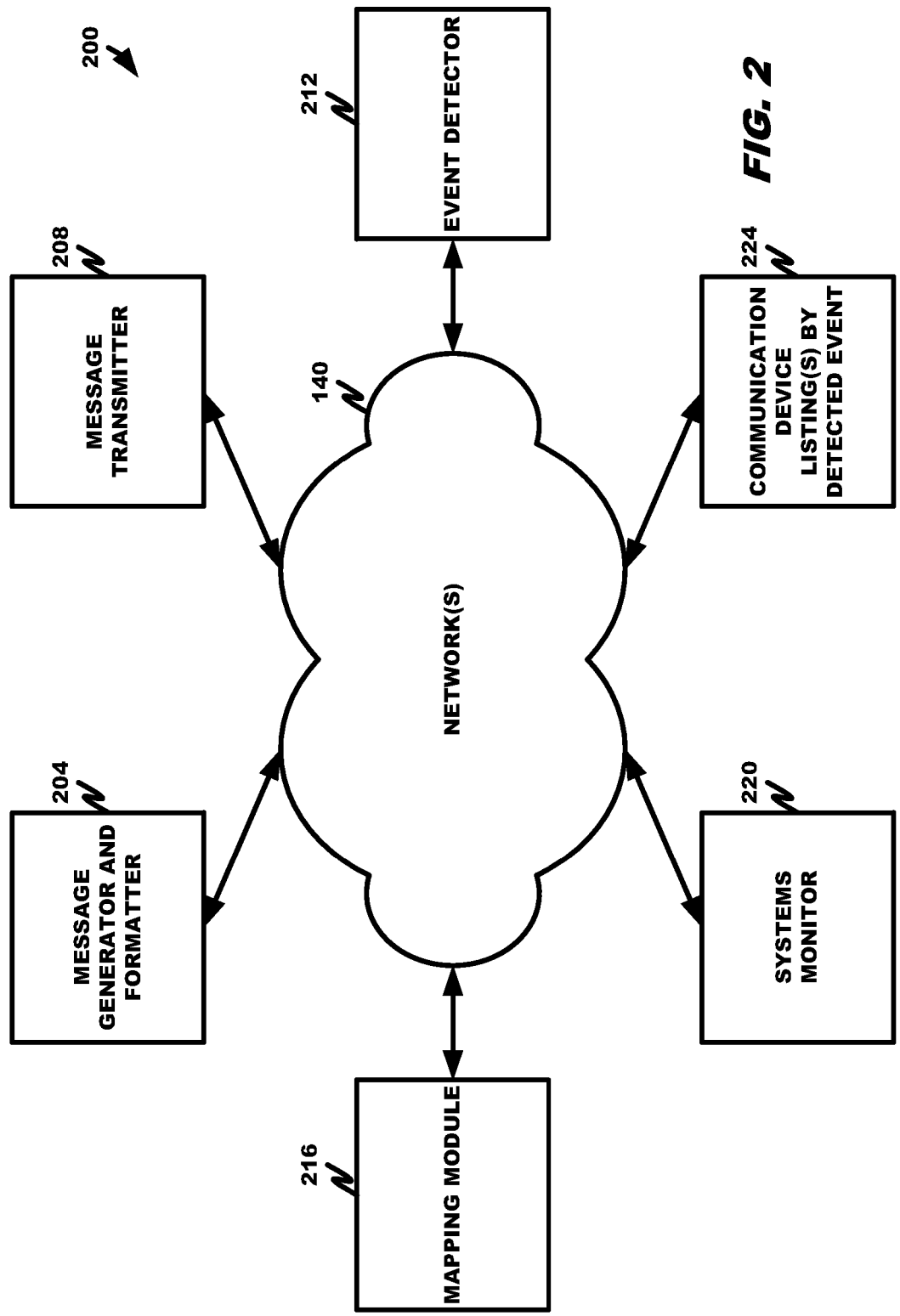
FIG. 2 is a block diagram of functional components in an emergency response system according to an embodiment of the disclosure.

Referring to FIG. 2, the functional modules of the emergency response system of the group administrator 124 will now be discussed. The emergency response system 200 includes a message generator and formatter 204, message transmitter 208, event detector 212, mapping module 216, and systems monitor 220 (which generates a communication device listing by detected event 224), all interconnected by network(s) 140.

The Message Generator and Formatter 204

The message generator and formatter 204 generates and formats for delivery a suitable message depending on the current state of the emergency event, the potential, historical or current impact of the emergency event, user or group administrator preferences such as business policies or rules, type or capabilities of the target communication device, personal information of the target group member, and the like.

The message can be of any form and may or may not have a personal element or component. It can be a text and/or voice and/or video message. It may contain a selectable link to other content accessible by the network(s) 140, a telephone number that may be called by selecting the number, and/or an email address that, when selected, automatically generates an email for the user to complete. The personal element or component can augment the generic message with individualized information, such as one or more back-up contacts, one or more ways to escalate an issue, information directing the calling or contacting party to a web site, a frequently asked question, policies or rules, and the like.

As an illustrative example, a generic greeting to a non-group user attempting to contact a group user might say:

Due to [EMERGENCY EVENT DESCRIPTION] situation impacting the [LOCATION AND/OR REGION AND/OR COMPANY], [ENTITY NAME] has limited, if any access to voice mail, email and/or instant message service at this time.

In this example, the bracketed fields represent personalized information, which can encourage the recipient to listen to or read the entire message. The generic greeting (which is the remainder of the message) can have many possible entries for each of the bracketed fields above (with the possible exception of instant messaging). In one implementation, the group administrator can insert the generic greeting, and information stored by each group user in turn provides personal and other information, such as alternative or back-up contacts. The possible personalized information responses can be stored in a table, database, or other accessible data structure.

In another example, the personal element of the message to a non-group user attempting to contact a group user might be:

If you are receiving this message, [PERSONAL NAME OF GROUP USER] likely does not have any ability to receive or reply to your [MESSAGE TYPE (E.G., VOICE MAIL, EMAIL, OR INSTANT MESSAGE] message at this time. If you need an immediate assistance regarding [TOPIC], please contact [BACK-UP NON-GROUP USER NAME] by phone at [SPECIFY PHONE NUMBER OF APPROPRIATE (NAMED) NON-GROUP USER] or by email at [SPECIFY EMAIL ADDRESS OF APPROPRIATE (NAMED) NON-GROUP USER].

Unlike the prior message, this message provides the contactor with one or more alternative points of contact in the event the purpose of the contact or the need of the contactor requires immediate service. One can have a table, database, or other accessible data structure showing one or more back-up non-group users indexed by topic and/or contactor with one or more catch-all categories for topics that do not fit a more specific category.

Where the message is to be provided to one or more group users potentially impacted by the emergency event, the message can also have predefined and personalized fields. An example might be:

You [GROUP USER NAME] are in the path of [EMERGENCY EVENT DESCRIPTION] situation that may severely impact the [LOCATION AND/OR REGION OF THE GROUP USER]. We therefore ask that you immediately go to [SPECIFIED LOCATION] and check [SPECIFY COMMUNICATION DEVICE(S)] for any updates.

The bracketed fields represent the personalized fields while the remaining textual fields represent the generic (non-personalized) message fields.

In yet another example, the message can be directed either to differently positioned group users or to non-group users contacting differently positioned group users. For instance, a first group user may be located in a first geographical area having a first degree of impact by the emergency event, a second group user may be located in a different second geographical area having a different second degree of impact by the emergency event, and a third group user may be located in a different third geographical area not yet impacted but likely to be impacted by the emergency event. Each of the first, second, and third group users could receive a different message to reflect their differing needs and/or circumstances. Alternatively, different messages can be sent to non-group users depending on whether the non-group user is attempting to contact any of the first, second, and third group users.

In a further example, different types and/or differently formatted messages are directed to different communication devices of group users and/or non-group users depending on the application. For example, a voice-only phone would receive a voice-only version of the message while a television or video-enabled communication device would receive a video-only or voice and/or video and/or text version of the message. A pop-up could be sent to an intelligent communication device for display to the user. An instant message could be sent to a tablet computer or wireless phone.

In a further example, different types and/or differently formatted messages are selected for a contactor of a group user depending on the identity of the contactor. For instance, a first contactor may have a first assigned value to the group administrator 124, a second contactor may have a second assigned value to the group administrator 124, and a third contactor may have a third assigned value to the group administrator 124. The different assigned values can be based on historical and/or potential revenue to the group administrator. Each of the first, second, and third contactors could receive a different message to reflect their differing assigned values.

In another example, different types and/or differently formatted messages are selected for a contactor based on a characteristic of the group user. Exemplary characteristics include job description, group user hierarchical position within the enterprise or administrator (e.g., position within an organizational chart), relationship to the enterprise or administrator, identity, and the like.

The Message Transmitter 208

The message transmitter 208 receives the generated and formatted message and transmits the message to one or more selected group user and/or non-group user communication devices, depending on the application. The message can be provided as a message to an inbound contact from a non-group user or as an outbound automated message to a group user or non-group user.

The message transmitter 208, for example, can allow a group administrator to change voice message greetings, email automated responses, social media status, and the like for a targeted set of group users during the emergency event, such as for instance when an entire enterprise location or region is unavailable to interact with vendors, partners, customers, and the like. In this manner, the message transmitter 208 can allow administrative over-ride of whatever voice messages, email automated responses, or the like have been selected by group users. The original group user message(s) is replaced with the generated and formatted message(s). The over-ride can be done by location and/or region to cover all individuals affected by the emergency event.

In another example, the message transmitter 208 is effected by the inbound contact routing mechanism 112 rerouting an inbound contact from a (non-group user) contactor to a contact center at another location where the group administrator has information available to reroute the contact to an appropriate party at another location to deal with the issue. Such a reroute may or may not involve providing the generated and formatted message to the non-group user contactor prior to, during, or after the reroute or transfer. The reroute or transfer can be done using bridging techniques, such as Avaya Inc.'s EC500 or using other methods.

In yet another example, the message transmitter 208 reroutes the inbound contact to or interfaces the non-group user contactor with an interactive response system where the contactor is provided with the message via one or more of answers to frequently asked questions, pre-recorded messages, alternate subject matter experts, alternate subject matter posts, or the like.

In yet another example, the (non-group user) contactor is re-routed to a social network 120 that provides the message. The social network can be associated with the contacted group user, the group administrator, another representative of the group administrator, and the like. For example, the contactor can be provided by the message with company relationships and structures or notifications or updates on the emergency event and how it is impacting the group administrator, a set of group users, and/or a defined area or region. This can be gated by the relationship with and trust in the contactor so that only legitimate contactors get directed to an alternative party to answer his or her question or receive another type of service.

In yet another example, the message would advise the (non-group user) contactor to follow a Twitter feed, blog, or other type of blogging service maintained by the group administrator for information updates regarding the impact of the emergency event, such as an estimated return date for the location and/or region of the enterprise and/or the impacted group user. As will be appreciated, a Twitter feed can be broadcast to customers and, as followers of the administrator, they would receive Tweets on updates of status and numbers to call for a contact center.

In yet a further example, the coverage path for all email auto response systems, all voice mail greetings, and all social media status is set to a sort of contact center where a message indicating the emergency event is played and subsequently the communication is transferred to another associate (e.g., contact center agent) elsewhere in the group administrator who is not impacted by the emergency event. This can not only provide the benefit of current status but also allow the communicating or contacting party to receive service or information during the emergency event via another associate.

In the above examples, the treatment of an inbound contact can be based on the contactor calling information (e.g., caller ID (such as caller identification (CID), calling line identification (CLID), calling number delivery (CND), calling number identification (CNID), calling line identification presentation (CLIP)) and/or contacted group user information (e.g., job description, group user hierarchical position within the enterprise or administrator, relationship to the enterprise or administrator, identity, group user presence information, and the like). As will be appreciated, Caller ID transmits a contactor's electronic address (e.g., telephone number) to the contactee's communication device during the ringing signal, or when the call is being set up but before the call is answered. Caller ID typically provides a name associated with the calling telephone number. The treatment of the inbound contact, such as whether it is provided with a message and/or whether and to whom it is rerouted, can depend on the administrator assigned value of the contactor. The reroute or transfer can be done using bridging techniques, such as Avaya Inc.'s EC500 or using other methods In yet another example, the message transmitter is effected by the outbound contact initiator 116 that, using a list of communication device listings for group users, contacts the identified group user communication devices 104a-n and provides the message to the group user. The ranking or ordering of the group users and associated communication devices on the listings can be based on the group user personal information, the group user characteristic(s) (e.g., current physical location of the group user compared to the area to be or currently impacted by the emergency event), the type of communication device in the listing, group user presence information, and the like. The message can be provided to the group user, for example, by a social network associated with the group user, by a telephone call to the group user's communication device, by an email or instant message or other type of message to the group user's communication device, by content displayed to the group user by his or her television, by a targeted message provided selectively (and not to at least one other radio user listening on the same channel) to the group user by his or her radio, and the like.

In yet another example, the message transmitter is effected by the outbound contact initiator 116 that contacts non-group user communication devices and provides the message to the non-group user. The ranking or ordering of the non-group users and associated communication devices in the outbound dialer address listings can be based on the non-group user personal information, the administrator assigned value to the non-group user, the type of non-group user communication device, non-group user presence information, and the like.

As will be appreciated, the various examples can be combined in any order depending on the application.

The Event Detector 212

The event detector 212 detects and obtains updates about the emergency event and provides the event information to the other components of the emergency response system 200. For example, event information, such as information describing a historical or current impact or occurrence of an event, can be identified based on emergency event information collected from the internet search engine 136 and/or news source 132 website or feed.

The Mapping Module 216

The mapping module 216 identifies a set of communication devices 104a-n of a group user potentially or actually impacted by the emergency event and generates the communication device listing(s) by detected emergency event 224.

The mapping module 216 can use emergency event information, such as a map (such as a weather surveillance radar or Doppler or pulse-Doppler radar map for weather, satellite maps, simulation models, and map representations) depicting areas or locations impacted or likely to be impacted by the emergency event and/or identifying facilities of an enterprise impacted or likely to be impacted by the emergency event, or other types of event information. The emergency event information can be received from a news source 132, the group administrator, a governmental entity, or other suitable source.

Based on the emergency event information, the mapping module 216 next identifies geographic location information associated with one or more group users. This, for example, can be based on whether the user is assigned to an enterprise location potentially or actually impacted by the emergency event, a current location of a communication device of the user in or within a specified distance near a location, area, or region potentially or actually impacted by the emergency event, a current travel path or trajectory (e.g., speed of travel, vector of travel, and the like) of a communication device of the user towards a location, area, or region potentially or actually impacted by the emergency event, a location of a residence of the group user, a browser setting, presence information, and the like. In the first case, the mapping module 216 can use a corporate directory and/or standardized directory structure, such as Lightweight Directory Access Protocol or LDAP, to identify which user's messages need to be overridden during the emergency event. In the second case, the current location or path or trajectory of travel of a user communication device can be determined by any suitable technique, such as triangulation, a satellite positioning system receiver in the communication device, group user presence information, and the like. In the third case, the residence location of the group user can be based on a standardized directory structure, such as LDAP or a telephone directory, a group database 128 maintained by a governmental entity, a presence service, and the like.

The communication device listing(s) 224 can include fields, including description of the emergency event, group user identification, electronic address of one or more group member communication devices of the identified group member, type and/or capabilities of the listed communication device, an ordering or ranking of the listed communication device, a timestamp when the corresponding communication device was last contacted, a result or outcome of the last contact attempt, and the like. The ranking or ordering of the various communication devices on the listings can be based on the group user personal information, the type of communication device in the listing, group user presence information, whether the communication device was or was not previously contacted successfully, and the like. The communication device listing 224 can be configured as a white listing of communication devices to be contacted or a black listing of communication devices not to be contacted by the emergency response system or a non-group user.

The Systems Monitor 220

The systems monitor 220 can perform various functions related to the various communication devices of a group user. It can determine whether the communication device is currently available or unavailable to be contacted. This can be done using known techniques for determining the state of health of a communication device or a connection to the communication device, such as a network discovery protocol. It can determine that the communication device is currently available or unavailable based on a grade or quality of service currently experienced or likely to be experienced by the communication device or a system malfunction of a control or communication channel to the communication device or the communication device itself. Grade or quality of service can be a function, for instance, of the available communication pathway bandwidth for the contact. The systems monitor 220 can determine a current actual or projected geographical location of a communication device; that is, whether the communication device is within or without a region or location impacted by the emergency event. It can filter out communication devices and/or group users based on the current actual or projected geographical location of a selected group user communication device. For example, if a group user's cell phone is currently located outside of the impacted region or location, it can be assumed that the respective group user is himself or herself not in the impacted region or location. He can therefore be dropped from the communication device listing.

The systems monitor 220 can also provide a graphical metaphor for the emergency response system so that management of outbound messages or inbound contact redirects can be managed and contact drops indicating failure to help the contactor can be monitored and logged.

The various functional modules can be collocated or located at discrete locations. One or more of the modules can be located at a server, an intermediate network node, and/or at the communication device itself. For example, the mapping module and/or systems monitor may be located at the communication device while the other modules are located at a server.

It will be clear to those skilled in the art, after reading this disclosure, how to make and use alternative embodiments that comprise any number of servers in any network topology, in which the overall functionality to be provided can be distributed across multiple servers.

Operation of the Emergency Response System 200

Figure 3:
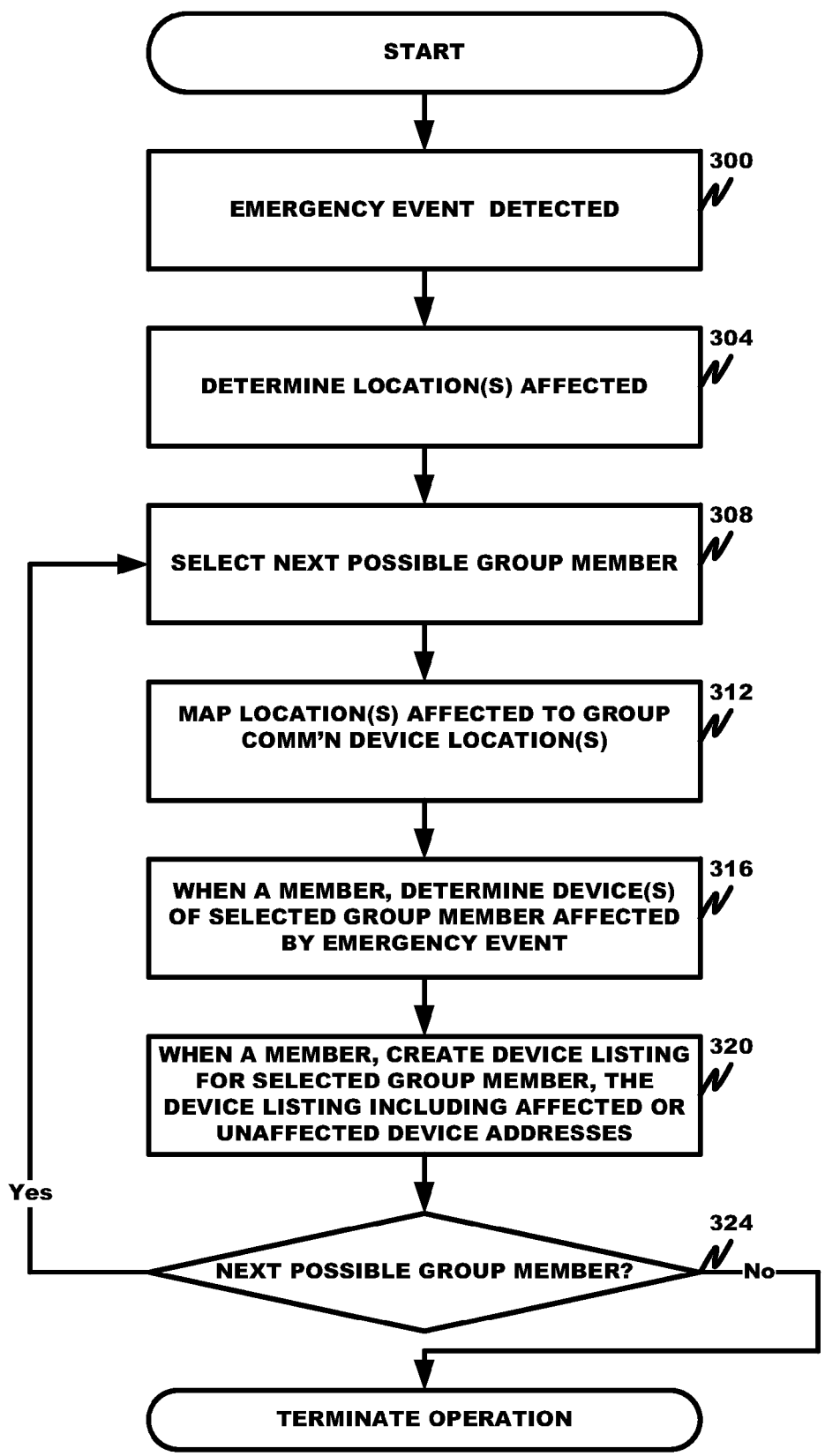
FIG. 3 is a logic flow chart according to an embodiment of the disclosure.

With reference to FIG. 3, the operation of the emergency response system 200 according to an embodiment is depicted.

In step 300, the event detector 212 detects occurrence or potential occurrence of an emergency event.

In step 304, the mapping module 216, in response to the detected emergency event, determines the geographical and/or facility locations affected by the detected emergency event.

In step 308, the mapping module 216 selects a next possible group member.

In step 312, the mapping module 216 maps the location(s) affected by the emergency event to the group communication device location(s). For example, for a selected group user, the mapping module 216 determines a geographic and/or logical location of each of the group user's communication devices.

This is done to determine whether the selected possible group member is to be included as a member of the set of group users. When a selected communication device is within the geographic and/or logical locations impacted by the emergency event, the selected possible group member is deemed to be a member of the set of group users. When a selected communication device is not within the geographic and/or logical locations impacted by the emergency event, the selected possible group member may not be deemed to be a member of the set of group users. The selected possible group member, in the latter case, may still be deemed to be a member of the set of group users when he or she is assigned to a facility impacted or likely to be impacted by the event.

In step 316, when the selected possible group member is a member of the group users, the systems monitor 220 determines the communication devices and/or other devices of the selected group member affected by the emergency event. Input to the systems monitor 220 includes, for example, social network affiliations of the selected group member, the communication persona of the selected group member, other demographics of the selected group member, selected group member presence information from a presence service, and communication devices associated with the selected group member. Effectively, the systems monitor 220 determines all enabled communication pathways (or communication modalities) available to contact the selected group member.

In step 320, the mapping module 216, using input from the systems monitor 220, creates a communication device listing 224 for the selected group member. The device listing includes, depending on the application, the affected or unaffected communication device electronic addresses for the selected group member. As noted, the device listing 224 may include other information.

In decision diamond 324, the mapping module 216 determines whether there is a next possible group member. If not, the mapping module 216 terminates operation. If so, the mapping module 216 returns to and repeats steps 308 through 320 with respect to the next possible group member.

Figure 4:
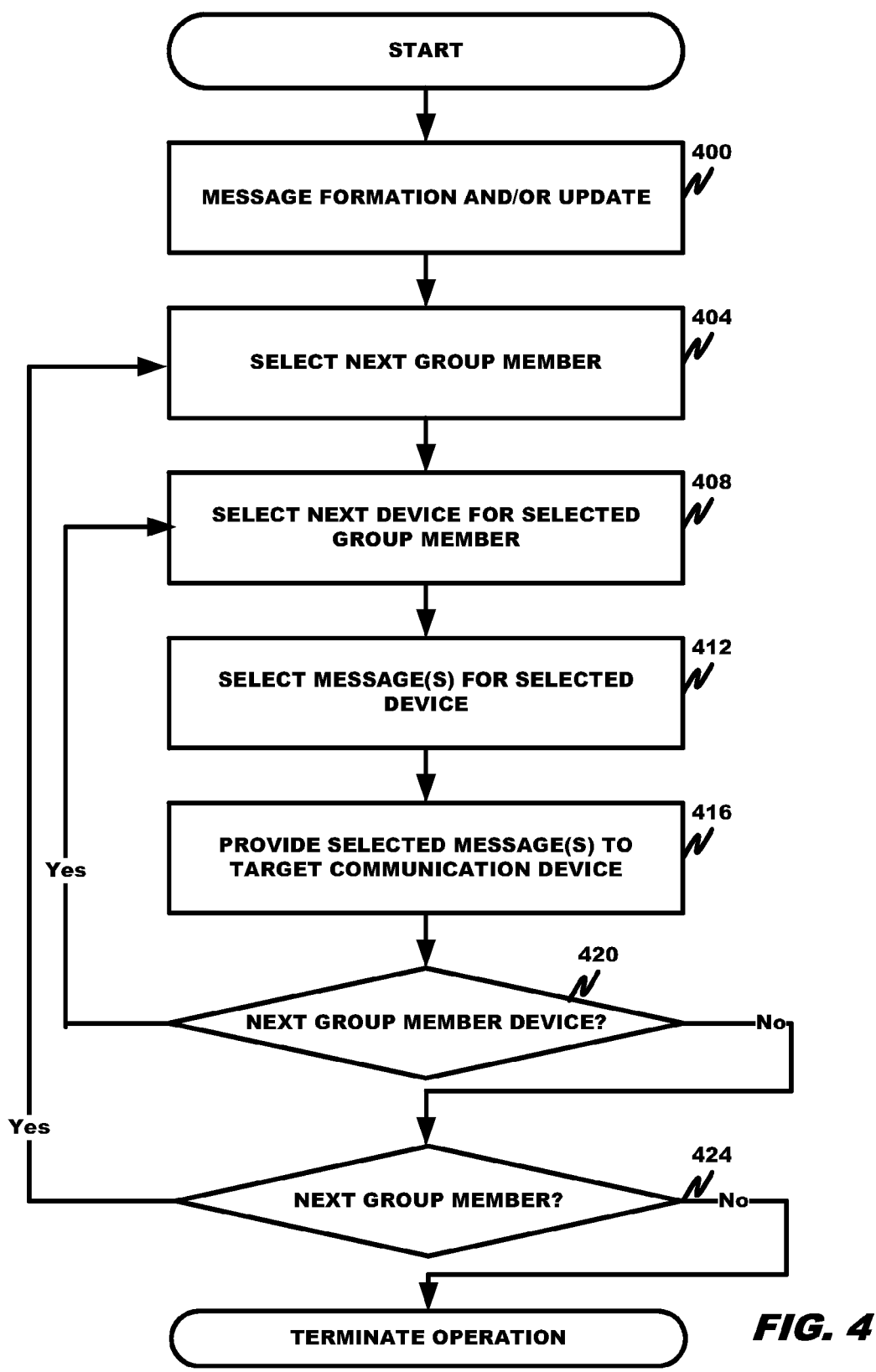
FIG. 4 is a logic flow chart according to an embodiment of the disclosure.

Referring now to FIG. 4, the operation of the emergency response system according to another embodiment is depicted. The emergency response system in FIG. 4 acts on input received from the processes of FIG. 3 or 5 (discussed below).

In step 400, the message generator and formatter 204 generates and formats the message associated with the various communication devices in the device listing 224 of FIG. 3. Relevant inputs to the message generator and formatter 204 in generating the message include the public-safety answering point (PSAP) associated with the selected group member, NOAA weather radio all hazards servicing the selected group member, the administrator, governmental and law enforcement authorities (such as the National Weather Service, FEMA, etc.), and the like. The message can be inputted by a human or generated automatically by a computational device.

In step 404, the message transmitter 208, from the device listing 224, selects a next group member and, in step 408, a next communication device for the selected group member.

In step 412, the message transmitter 208 selects, from among multiple generated and differently formatted messages, the appropriate message either for the selected group member and communication device when the target device to be contacted is the selected group member communication device or for a (non-group user) communication device contacting the selected group member or his or her communication device or to be contacted by the administrator 124 and, in step 416, provides the selected message to the target communication device. Alternatively, the message may be provided to the administrator for posting on a social network 120 or blog or for a messaging server 108, inbound contact routing mechanism 112, outbound contact initiator 116, a television or radio broadcaster for broadcasting, a telecommunications service provider to provide to a contactor, etc.

In decision diamond 420, the message generator and formatter 204 determines whether there is a next group member communication device for the selected group member. If so, the message generator and formatter 204 returns to and repeats steps 408 through 416 for that group member communication device. If not, the message generator and formatter 204, in decision diamond 424, determines whether there is a next group member. If so, the message generator and formatter 204 returns to and repeats steps 404 through 416 for that group member. When there is no next group member, the message generator and formatter 204 terminates operation.

Figure 5:
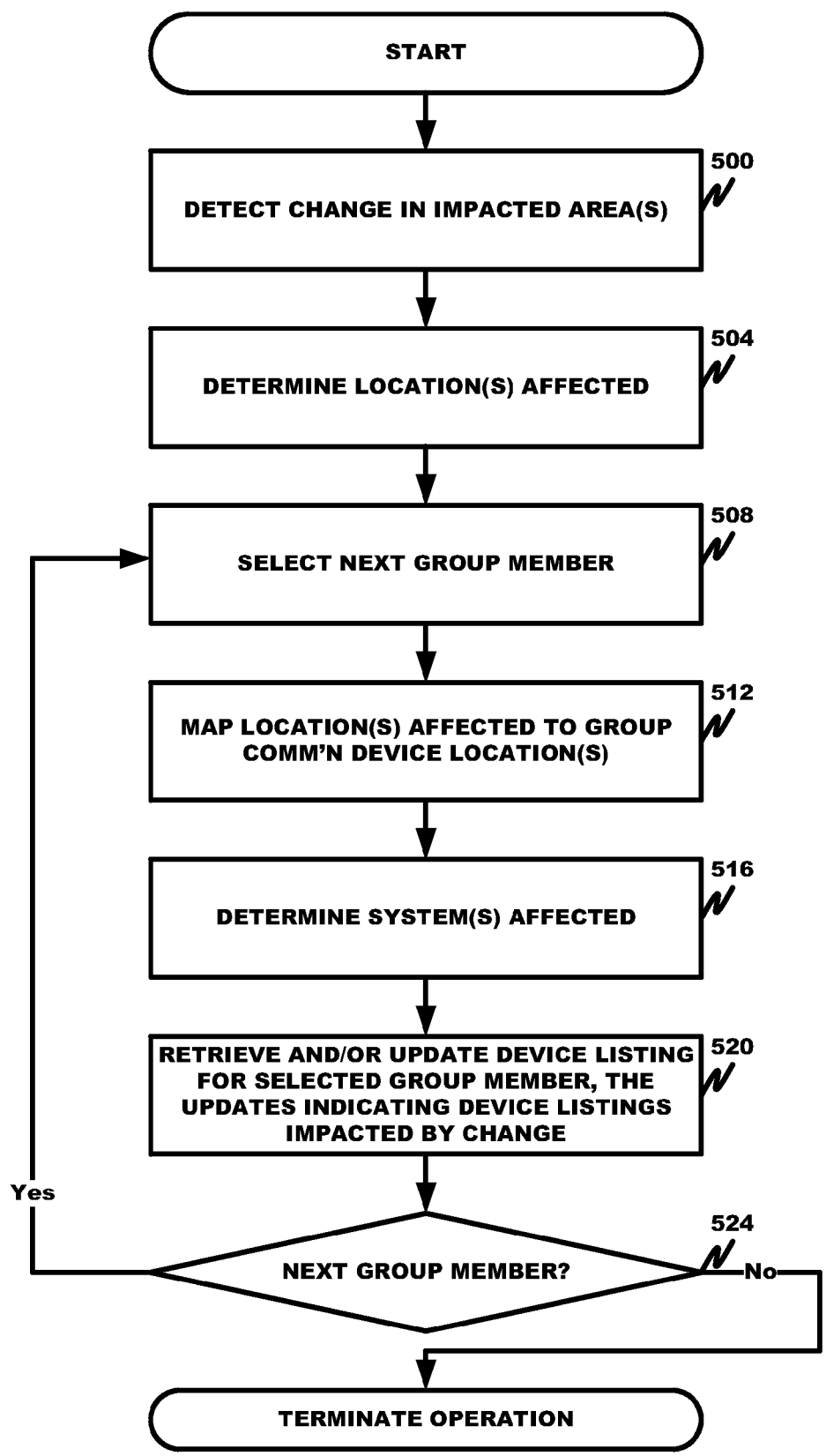
FIG. 5 is a logic flow chart according to an embodiment of the disclosure.

With reference to FIG. 5, the operation of the emergency response system 200 according to an embodiment is depicted.

In step 500, the event detector 212 detects a change in the impact or potential impact of an emergency event.

In step 504, the mapping module 216, in response to the detected change, determines the geographical and/or facility locations affected by the detected change.

In step 508, the mapping module 216 selects a next group member.

In step 512, the mapping module 216 maps the location(s) affected by the detected change in the emergency event to the group communication device location(s). For example, for a selected group user, the mapping module 216 determines a geographic and/or logical location of each of the group user's communication devices to determine what communication devices and communication modalities may be contactable and/or what group members may no longer qualify as group users. When a selected communication device is no longer within the geographic and/or logical locations impacted by the emergency event, the selected group member may be deemed to no longer be a member of the set of group users and is subject to the process of FIG. 6 below. When a selected communication device remains within the geographic and/or logical locations impacted by the emergency event, the selected group member remains a member of the set of group users.

In step 516, the systems monitor 220 determines the communication devices and/or other devices of the selected group member no longer affected by the emergency event.

In step 520, the mapping module 216, using input from the systems monitor 220, updates the communication device listing 224 to remove the selected group member and his corresponding communication devices and/or, when the selected group member remains a group member, to remove communication devices no longer impacted or likely to be impacted by the emergency event.

In decision diamond 524, the mapping module 216 determines whether there is a next possible group member. If not, the mapping module 216 terminates operation. If so, the mapping module 216 returns to and repeats steps 508 through 520 with respect to the next possible group member.

Figure 6:
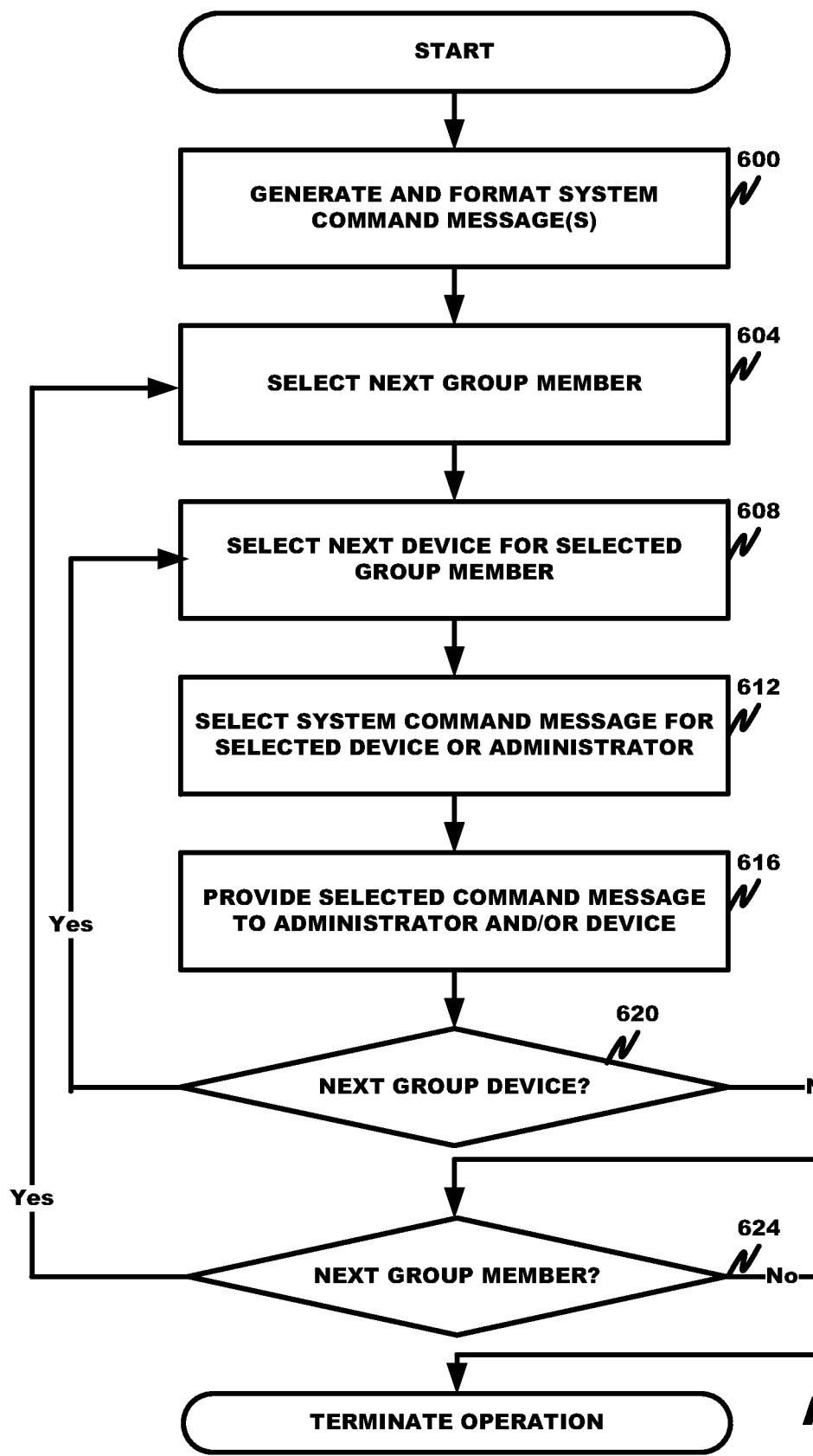
FIG. 6 is a logic flow chart according to an embodiment of the disclosure.

Referring now to FIG. 6, the operation of the emergency response system according to another embodiment is depicted.

In step 600, the message generator and formatter 204 generates and formats a system command message associated with the various communication devices associated with the group user(s) no longer deemed to be a member of the set of group users impacted by the emergency event. The system command message, effectively, provides a timestamp after which the various communication devices associated with the former group member are to return to their pre-emergency event settings; that is, the messaging server(s) 108 are to resume using the pre-emergency event greetings, special call treatment by the inbound contact routing mechanism 112 is to terminate to the pre-emergency settings (or contact treatment), the outbound contact initiator 116 is to cease making contacts associated with the former group member, social networks associated with the former group member are to cease posting emergency event-related messages, and the like.

In step 604, the message transmitter 208, from the device listing 224, selects a next group member and, in step 608, a next communication device for the selected group member.

In step 612, the message transmitter 208 selects, from among multiple generated and differently formatted system command messages, the appropriate system command message either for the selected group member and communication device when the target device to be contacted is the selected group member communication device or for a (non-group user) communication device contacting the selected group member or his or her communication device or to be contacted by the administrator 124 and, in step 616, provides the selected message to the target communication device. Alternatively, the message may be provided to the administrator, for posting on a social network 120 or blog, inbound contact routing mechanism 112, outbound contact initiator 116, a television or radio broadcaster, a telecommunications service provider, etc.

In decision diamond 620, the message generator and formatter 204 determines whether there is a next group member communication device for the selected group member. If so, the message generator and formatter 204 returns to and repeats steps 608 through 616 for that group member communication device. If not, the message generator and formatter 204, in decision diamond 624, determines whether there is a next group member. If so, the message generator and formatter 204 returns to and repeats steps 604 through 616 for that group member. When there is no next group member, the message generator and formatter 204 terminates operation.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the inbound contact routing mechanism 112 reroutes an inbound contact from a (non-group user) contactor to an appropriate party or other resource at another location to service the contact. The party or resource may be part of a distributed contact center. Such a reroute does not involve providing a generated and formatted message to the non-group user contactor prior to, during, or after the reroute or transfer. The party or resource to whom the contact is redirected can optionally notify the contactor regarding the need or reason for the contact rerouting. The reroute or transfer can be done using bridging techniques, such as Avaya Inc.'s EC500 or using other methods.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor executing a microprocessor executable mapping module of a group administrator, that one or more of a selected person and a selected communication device of the selected person has been or may be impacted by an emergency event; and
   in response to the determining, changing, by a microprocessor executing an automated function of the group administrator, one or more of the following: (i) an automated greeting message or selected person status message provided to a contactor contacting the selected communication device, the automated greeting message or selected person status message being provided to a contactor in the absence of an emergency event, to a changed greeting message or status message associated with the emergency event and (ii) a communication event treatment of an inbound communication event from the contactor to the one or more of a selected person and a selected communication device to one or more of (A) notify the contactor of an impact or potential impact of the emergency event on the one or more of the selected person and selected communication device and (B) service the inbound communication event by a resource not impacted by the emergency event, the communication event treatment of the inbound communication event comprising changing from a first coverage path to a second coverage path for one or more selected electronic addresses, the one or more selected electronic addresses including an electronic address of the selected communication device, wherein the inbound communication event is directed to a different electronic address than the electronic address of the selected communication device.

2. The method of claim 1, wherein the greeting message or status message is provided by a first communication mode by a switch or server, the switch or server controlling the selected communication device, wherein another automated greeting message or selected person status message is provided by a second communication mode by another messaging server to a contactor of the selected person, wherein the greeting message or status message provided by the first communication mode is automatically changed to the other automated greeting message or selected person status message provided by the second communication mode, wherein, in the determining, a microprocessor executable systems monitor determines that the selected communication device associated with the selected person has been impacted by an emergency event, and wherein the mapping module determination is based on input from the systems monitor.

3. The method of claim 1, wherein the group administrator controls the selected communication device, wherein the greeting message is provided to the contactor, wherein a content and format of the greeting message depends upon one or more of the contacting communication device and contactor identity, wherein the greeting message comprises generic and personalized message portions, the personalized message portion being associated uniquely with the person being contacted, wherein the generic message portion is provided to all contactors to persons affected or potentially impacted by the emergency event, and wherein the personalized message portion corresponding to the selected person is provided only to contactors of the selected person.

4. The method of claim 1, wherein the greeting message is provided to the contactor, wherein the greeting message or status message is provided by a first messaging server in a first communication mode, wherein another automated greeting message or selected person status message is provided by a second messaging server in a second communication mode to a contactor of the selected person, wherein the change to the greeting message or status message provided by the first communication mode is automatically made to the other automated greeting message or selected person status message provided by the second communication mode, and wherein the change to the greeting message or status message is administered geographic location by geographic location and limited to one or more of persons and communication devices in geographic locations potentially impacted by the emergency event.

5. The method of claim 1, wherein the group administrator changes communication event treatment of the inbound communication event from the contactor to the one or more of a selected person and a selected communication device to one or more of (A) notify the contactor of an impact or potential impact of the emergency event on the one or more of the selected person and selected communication device and (B) service the inbound communication event by a resource not impacted by the emergency event.

6. The method of claim 1, wherein the greeting message is provided to the contactor and wherein, after the impact of the emergency event is determined to be less than a selected impact level, the automated function returns the greeting message to a pre-emergency event form and content.

7. The method of claim 1, wherein the greeting message is provided to the contactor and wherein different greeting messages are sent to different contactors having different assigned values, wherein the greeting message is provided to the contactor by one or more of a social network and blog posting, wherein the status of the status message is a social media status, and wherein the contactor is provided with a social media status of the selected person.

8. The method of claim 1, wherein, in the determining, the microprocessor executable mapping module of the group administrator determines whether the selected communication device of the selected person is currently available or unavailable to be contacted and applies the following rules: when the selected communication device is currently available to be contacted, the selected communication device and selected person are determined not to be impacted by the emergency event and when the selected communication device is currently unavailable to be contacted, the selected communication device and selected person are determined to be impacted by the emergency event.

9. The method of claim 1, wherein the microprocessor executable mapping module of the group administrator determines whether the one or more of a selected person and a selected communication device of the selected person has been or may be impacted by an emergency event by determining a current actual or projected geographic location of the selected communication device, compares the current actual or projected geographic location to a geographic location of the emergency event, and applies the following rules: when the current actual or projected geographic location of the selected communication device is determined to be outside the geographic location of the emergency event, the selected communication device and selected person are determined not to be impacted by the emergency event and when the current actual or projected geographic location of the selected communication device is determined to be within the geographic location of the emergency event, the selected communication device and selected person are determined to be impacted by the emergency event, wherein communication event treatment is provided to the inbound communication event from the contactor, and wherein the communication event treatment is one or more of routing the inbound communication event to an interactive voice response unit and routing the inbound communication event to a human agent.

10. A system, comprising:
a microprocessor;
a microprocessor executable mapping module that determines that one or more of a selected person and a selected communication device of the selected person has been or may be impacted by an emergency event; and
a microprocessor executable automated function that, in response to the determining operation, changes one or more of the following: (i) an automated greeting message or selected person status message provided to a contactor, the automated greeting message or selected person status message being provided to a contactor in the absence of an emergency event, to a changed greeting message or status message associated with the emergency event, and (ii) a communication event treatment of an inbound communication event from the contactor to the one or more of a selected person and a selected communication device to one or more of (A) notify the contactor of an impact or potential impact of the emergency event on the one or more of the selected person and selected communication device and (B) service the inbound communication event by a resource not impacted by the emergency event, the communication event treatment of the inbound communication event comprising changing from a first coverage path to a second coverage path for one or more selected electronic addresses, the one or more selected electronic addresses including an electronic address of the selected communication device, wherein the inbound communication event is directed to a different electronic address than the electronic address of the selected communication device.

11. The system of claim 10, further comprising a microprocessor executable systems monitor to determine that the selected communication device is associated with the selected person has been impacted by an emergency event and wherein the mapping module determination is based on input from the systems monitor, wherein the greeting message or status message is provided by a first communication mode by a switch or server, the switch or server controlling the selected communication device, wherein another automated greeting message or selected person status message is provided by a second communication mode by another messaging server to a contactor of the selected person, wherein the greeting message or status message provided by the first communication mode is automatically changed to the other automated greeting message or selected person status message provided by the second communication mode.

12. The system of claim 10, wherein a group administrator controls the selected communication device, wherein the greeting message is provided to the contactor, wherein a content and format of the greeting message depends upon one or more of the contacting communication device and contactor identity, wherein the greeting message comprises generic and personalized message portions, the personalized message portion being associated uniquely with the person being contacted, wherein the generic message portion is provided to all contactors to persons affected or potentially impacted by the emergency event, and wherein the personalized message portion corresponding to the selected person is provided only to contactors of the selected person.

13. The system of claim 10, wherein the greeting message is provided to the contactor, wherein the greeting message or status message is provided by a first messaging server in a first communication mode, wherein another automated greeting message or selected person status message is provided by a second messaging server in a second communication mode to a contactor of the selected person, wherein the change to the greeting message or status message provided by the first communication mode is automatically made to the other automated greeting message or selected person status message provided by the second communication mode, and wherein the change to the greeting message or status message is administered geographic location by geographic location and limited to one or more of persons and communication devices in geographic locations potentially impacted by the emergency event.

14. The system of claim 10, wherein a group administrator controls the selected communication device, wherein the group administrator changes communication event treatment of the inbound communication event from the contactor to the one or more of a selected person and a selected communication device to one or more of (A) notify the contactor of an impact or potential impact of the emergency event on the one or more of the selected person and selected communication device and (B) service the inbound communication event by a resource not impacted by the emergency event.

15. The system of claim 10, wherein the greeting message is provided to the contactor and wherein, after the impact of the emergency event is determined to be less than a selected impact level, the automated function returns the greeting message to a pre-emergency event form and content.

16. The system of claim 10, wherein the greeting message is provided to the contactor and wherein different greeting messages are sent to different contactors having different assigned values, wherein the greeting message is provided to the contactor by one or more of a social network and blog posting, wherein the status of the status message is a social media status, and wherein the contactor is provided with a social media status of the selected person.

17. The system of claim 10, wherein, in the determining operation, the microprocessor executable mapping module determines whether the selected communication device of the selected person is currently available or unavailable to be contacted and applies the following rules: when the selected communication device is currently available to be contacted, the selected communication device and selected person are determined not to be impacted by the emergency event and when the selected communication device is currently unavailable to be contacted, the selected communication device and selected person are determined to be impacted by the emergency event.

18. The system of claim 10, wherein the microprocessor executable mapping module determines whether the one or more of a selected person and a selected communication device of the selected person has been or may be impacted by an emergency event by determining a current actual or projected geographic location of the selected communication device, compares the current actual or projected geographic location to a geographic location of the emergency event, and applies the following rules: when the current actual or projected geographic location of the selected communication device is determined to be outside the geographic location of the emergency event, the selected communication device and selected person are determined not to be impacted by the emergency event and when the current actual or projected geographic location of the selected communication device is determined to be within the geographic location of the emergency event, the selected communication device and selected person are determined to be impacted by the emergency event, wherein communication event treatment is provided to the inbound communication event from the contactor and wherein the communication event treatment is one or more of routing the inbound communication event to an interactive voice response unit and routing the inbound communication event to a human agent.

19. A tangible and non-transitory computer readable medium comprising microprocessor executable instructions that cause the microprocessor, to:
   determine that one or more of a selected person and a selected communication device of the selected person has been or may be impacted by an emergency event; and
   in response to the determination, change one or more of the following: (i) an automated greeting message or selected person status message provided to a contactor contacting the selected communication device, the automated greeting message or selected person status message being provided to a contactor in the absence of an emergency event, to a changed greeting message or status message associated with the emergency event, and (ii) a communication event treatment of an inbound communication event from the contactor to the one or more of a selected person and a selected communication device to one or more of (A) notify the contactor of an impact or potential impact of the emergency event on the one or more of the selected person and selected communication device and (B) service the inbound communication event by a resource not impacted by the emergency event, the communication event treatment of the inbound communication event comprising changing from a first coverage path to a second coverage path for one or more selected electronic addresses, the one or more selected electronic addresses including an electronic address of the selected communication device, wherein the inbound communication event is directed to a different electronic address than the electronic address of the selected communication device.

20. The computer readable medium of claim 19, wherein the greeting message or status message is provided by a first communication mode by a switch or server, the switch or server controlling the selected communication device, wherein another automated greeting message or selected person status message is provided by a second communication mode by another messaging server to a contactor of the selected person, wherein the greeting message or status message provided by the first communication mode is automatically changed to the other automated greeting message or selected person status message provided by the second communication mode, wherein the microprocessor determines that the selected communication device associated with the selected person has been impacted by an emergency event, wherein the greeting message is provided to the contactor, wherein the greeting message comprises generic and personalized message portions, the personalized message portion being associated uniquely with the person being contacted, wherein the generic message portion is provided to all contactors to persons affected or potentially impacted by the emergency event, wherein the personalized message portion corresponding to the selected person is provided only to contactors of the selected person, wherein a content and format of the greeting message depends upon one or more of the contacting communication device and contactor identity, wherein different greeting messages are sent to different contactors having different assigned values, and wherein, after the impact of the emergency event is determined to be less than a selected impact level, the microprocessor returns the greeting message to a pre-emergency event form and content.

21. The computer readable medium of claim 19, wherein instructions provide the greeting message to the contactor by one or more of a social network and blog posting, wherein the status is a social media status and wherein the contactor is provided with a social media status of the selected person.

22. The computer readable medium of claim 19, wherein instructions provide the greeting message to the contactor, wherein instructions provide the greeting message or status message by a first messaging server in a first communication mode, wherein instructions provide another automated greeting message or selected person status message by a second messaging server in a second communication mode to a contactor of the selected person, wherein the change to the greeting message or status message provided by the first communication mode is automatically made to the other automated greeting message or selected person status message provided by the second communication mode, wherein the change to the greeting message or status message is administered geographic location by geographic location and limited to one or more of persons and communication devices in geographic locations potentially impacted by the emergency event, and wherein the microprocessor determines whether the one or more of a selected person and a selected communication device of the selected person has been or may be impacted by an emergency event by determining a current actual or projected geographic location of the selected communication device, compares the current actual or projected geographic location to a geographic location of the emergency event, and applies the following rules: when the current actual or projected geographic location of the selected communication device is determined to be outside the geographic location of the emergency event, the selected communication device and selected person are determined not to be impacted by the emergency event and when the current actual or projected geographic location of the selected communication device is determined to be within the geographic location of the emergency event, the selected communication device and selected person are determined to be impacted by the emergency event.

23. The computer readable medium of claim 19, wherein, in the determining, instructions cause the microprocessor to determine whether the selected communication device of the selected person is currently available or unavailable to be contacted and apply the following rules: when the selected communication device is currently available to be contacted, the selected communication device and selected person are determined not to be impacted by the emergency event and when the selected communication device is currently unavailable to be contacted, the selected communication device and selected person are determined to be impacted by the emergency event, wherein communication event treatment is provided to the inbound communication event from the contactor, and wherein the communication event treatment is one or more of routing the inbound communication event to an interactive voice response unit and routing the inbound communication event to a human agent.

\* \* \* \* \*

UNITED STATES PATENT AND TRADEMARK OFFICE
CERTIFICATE OF CORRECTION

PATENT NO. : 9,241,069 B2  
APPLICATION NO. : 14/146527  
DATED : January 19, 2016  
INVENTOR(S) : David S. Mohler Page 1 of 1

It is certified that error appears in the above-identified patent and that said Letters Patent is hereby corrected as shown below:

In the Claims
At Column 24, line 24, please delete the "," after "microprocessor".

Signed and Sealed this
Twenty-fourth Day of May, 2016

Michelle K. Lee
*Director of the United States Patent and Trademark Office*